United States Patent [19]
Moquin et al.

[11] Patent Number: 5,519,768
[45] Date of Patent: May 21, 1996

[54] FACSIMILE DETECTION SYSTEM AND METHOD

[75] Inventors: Thomas J. Moquin, Alpharetta; David G. Kelley, Jr., Tucker; Evan Kraus, Atlanta; Eric R. Quinn, Decatur; Raymond J. Smets, Alpharetta; Terry Durand, Marietta, all of Ga.

[73] Assignee: BellSouth Corporation, Atlanta, Ga.

[21] Appl. No.: 347,604

[22] Filed: Dec. 1, 1994

[51] Int. Cl.⁶ .................................................. H04M 11/00
[52] U.S. Cl. .................................................. 379/100; 379/97
[58] Field of Search ............................ 379/100, 113, 379/201, 211, 221, 230, 93, 94, 97, 98; 358/400, 468, 402, 407

[56] References Cited

U.S. PATENT DOCUMENTS

| | | | |
|---|---|---|---|
| 4,788,718 | 11/1988 | McNabb et al. | 379/113 |
| 4,868,865 | 9/1989 | Ogawa et al. | 379/100 |
| 5,151,972 | 9/1992 | Lorenz et al. | 379/93 |
| 5,202,915 | 4/1993 | Nishii | 379/100 |
| 5,267,302 | 11/1993 | Kotani et al. | 379/100 |
| 5,280,519 | 1/1994 | Nakajima et al. | 379/100 |
| 5,287,402 | 2/1994 | Nakajima | 379/100 |

*Primary Examiner*—Jason Chan
*Attorney, Agent, or Firm*—Jones & Askew

[57] ABSTRACT

In connection with enhanced telephone service, such as personal number service, the detection of whether an incoming telephone call is a facsimile transmission or an ordinary voice call is improved by a utilizing a modified ring back signal during the time in which the service circuit node of the telephone system is attempting to detect the presence of the calling tone (CNG signal) of the sending facsimile machine. Particularly, the ring back signal is modified to increase the off time of the ring back signal to be greater than the period of the CNG signal. Where the CNG signal is a periodic signal with a period of 4 seconds with a 0.5 on time and a 3.5 off time, the modified ring back signal has a period of 7 seconds with a 2 second on time and a 5 second off time.

4 Claims, 2 Drawing Sheets

FACSIMILE DETECTION SYSTEM AND METHOD

TECHNICAL FIELD

The present invention relates to telephony and more particularly relates to a system and method for detecting whether an incoming telephone call to a number designated for enhanced service, such as personal number service, is a facsimile transmission or an ordinary voice call.

BACKGROUND OF THE INVENTION

In the late 1970s and early 1980s, American Telephone & Telegraph Company (AT&T) developed early species of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high speed digital data that could first determine whether a call could be completed prior to assigning trunk capacity to set up the voice link. Thus, with common channel interoffice signaling the identity of the called number can be transmitted over the interoffice signaling data links from the originating central office to the terminating central office. The terminating central office is the central office that services the called number. If the called number is busy, data providing this information is transmitted back over the interoffice signaling link to the originating central office that locally provides an audible busy signal to the caller. Therefore, no long distance trunk capacity is occupied during this process, and the voice circuits remain free for other uses. If the called number is not busy, various devices in the network respond to the information about this call to assign interoffice trunks to set up a connection for the call. While the call is being set up the originating central office, based on a signal from the terminating central office, returns an audible ring back tone (RBT) to the caller. Once the called number is answered, an answer signal is passed from the terminating central office to the originating central office, the ring back tone is terminated, and the call is completed.

The public switched telephone network evolved in the 1980s to a complex and very versatile system, most of which supports and is controlled by a form of common channel interoffice signaling. The basics of this network were designed by AT&T. It is commonly referred to as the advanced intelligent network (AIN). Such an advanced intelligent network is shown in FIG. 1, and the advanced intelligent network forms the environment of the present invention.

In the modern intelligent public switched telephone network, the same signaling path described above that is used for basic call set up, take down and routing, is also used to provide enhanced custom calling features and to control the operation of billing equipment and maintain billing records. One enhanced calling feature that may be delivered by the advanced intelligent network is personal number service. Personal number service is described in detail in U.S. patent application Ser. No. 07/936,384, filed Aug. 26, 1992 and assigned to BellSouth Corporation, the assignee of the present invention.

Each subscriber to personal number service is assigned a personal number. In turn, call routing information in the form of a data base of one or more hierarchical lists of destinations based on the time of day and day of the week from each subscriber is input into the advanced intelligent network. The data base of call routing information may be maintained either at the service circuit node (SCN) of the advanced intelligent network or at the service control point (SCP) of the advanced intelligent network. For the purposes of the following discussion, the data base of call routing information will be considered to reside at the service control point. The hierarchy and composition of the destination lists may be changed by the subscriber, and the subscriber may enable an override or make a request to direct selected calls to a specific destination, as necessary.

Any call directed to a subscriber's personal number is identified as a personal number service call by a query sent to the service control point of the advanced intelligent network. Once the call is identified as a personal number service call, the source of the call is identified. The identification of the source of the call made in several ways. First, the calling line number of the call is identified and compared to entries in a data base containing correlated calling line number and identity information. Second, the subscriber may have provided the service control point with identity information corresponding to particular calling lines. For example, the subscriber may have designated persons using certain calling lines as priority callers. In addition, the caller may provide the service control point with identity information through the input of a particular code. The service control point recognizes the code as identifying a priority caller. If the service control point fails to find or the caller does not immediately provide such identity information, the caller is requested by a recording from the service control point to provide such information.

While the source of the call is being identified, the service control point selects a first destination from the hierarchical list of destinations. At the first destination, the service control point announces the identified source of the call and requests call disposition information as to the acceptance, formal rejection or passive rejection, such as a no answer, of the call. If accepted, the service control point in conjunction with the signal transfer point routes the call to the first destination in the ordinary fashion. If rejected, the service control point routes the call to the default destination selected by the subscriber. If there is no response frown the called party at the first destination, this lack of response is considered a passive rejection. The service control point then requests call disposition information from the next destination in the destination list according to the hierarchy selected by the subscriber. The service control point continues to request call disposition information from each sequential destination on the destination list until the call is accepted or until the last destination on the destination list is reached, at which point the call is routed to the last destination. Personal number service thus allows subscribers to use one personal number as a contact number for receipt of all communications including wireline, wireless, facsimile transmissions and pagers.

As noted above, personal number service can be used as a contact number for facsimile transmissions. Personal number service can thereby be used to route the facsimile transmission to a selected destination which has been selected by the subscriber and which has a receiving facsimile machine. Alternatively, the subscriber can designate that a facsimile transmission should be stored at the service circuit node for later retrieval. In order to store the facsimile transmission or to route a facsimile call to the designated facsimile destination properly, the advanced intelligent network must be able to recognize that the originating call is from a facsimile machine.

For an ordinary facsimile call that is not directed to a number designated for personal number service, the sending facsimile machine originates the call by first going off hook and then dialing the called party. Once the dialing operation has been completed, the sending facsimile machine begins generating a 1200 hz calling tone signal (CNG signal) indicating a non-aural transmission is contemplated. The CNG signal is periodic with a 0.5 second 1200 hz tone followed by 3.5 seconds of silence. Once the voice connection has been set up and the called party has answered, the CNG signal alerts the instrument at the called destination that it should respond to such a non-aural transmission. The CNG signal initiates the handshaking procedure which allows the two facsimile machines to communicate and send and receive the facsimile transmission.

In the circumstance of personal number service, the advance intelligent network should be able to recognize the existence of a facsimile transmission prior to making the selection of the call destination from the hierarchical list supplied by the subscriber or before storing the facsimile transmission for later retrieval. Conventionally, once the call is identified as a number designated for personal number service, the service switching point (SSP) central office switch of the calling party is connected by a line to the service circuit node of the advanced intelligent network. The service circuit node then sends an answer signal to the SSP central office switch over the same line. The SSP central office switch of the calling party opens a speech path over the line between the calling party and the service circuit node. The service circuit node sends the industry standard ring back tone (RBT) to the calling party from a tone generator located in the service circuit node. The RBT provides feedback to the calling party to assure the calling party that the advanced intelligent network is setting up the call. While the service circuit node is sending back the standard RBT to the calling party, the service circuit node also connects a facsimile port to the line in an effort to detect the CNG signal from the incoming call. If the service circuit node detects the CNG signal from the incoming call, it identifies the call as being a facsimile transmission. Depending on the subscriber's preference, the facsimile transmission is either stored at the service circuit node for later retrieval or the service circuit node instructs the SSP central office switch to transfer the call to the line designated by the subscriber for receipt of facsimile transmissions.

As is apparent from the foregoing description, the proper storage or routing of the facsimile transmission to the designated location of the subscriber's facsimile machine depends on the facsimile port in the service circuit node detecting the existence of the CNG signal from the incoming call. At present, studies have found that the success rate for detecting facsimile calls is only about 87% for such personal number service. Therefore, where personal number service is being used, a facsimile machine which initiates a call has a 13% chance of being connected in error to a voice call destination instead of being properly connected to the subscriber's designated facsimile destination or being properly connected to a facsimile port in the service circuit node for storage of the facsimile transmission for later retrieval.

SUMMARY OF THE INVENTION

It is therefore an object of the present invention to provide a system and method for accurately detecting whether an incoming telephone call to a number designated for enhanced service, such as personal number service, is a facsimile transmission or an ordinary voice call.

More particularly, it is an object of the present invention to provide a system and method for accurately detecting the existence of a CNG signal in the incoming call at the service circuit node.

The foregoing objects are realized by the present invention which constitutes a system and method for detecting the existence of the CNG signal in the incoming call at the service circuit node by utilizing a modified ring back tone while the facsimile port of the service circuit node is engaged in the detection of the existence of the CNG signal in the incoming call.

The foregoing invention springs from the discovery by the inventors that the industry standard ring back signal provided by the service circuit node on the trunk line to the calling party interferes with detection of the incoming CNG signal. The standard ring back tone has a period of 6 seconds comprising 2 seconds on and 4 seconds off. The standard CNG signal has a 4 second period comprising a 1200 hz tone which is on for 0.5 second followed by 3.5 seconds of silence. The overlap of the "on" periods for those two signals produces sufficient interference to degrade the detection capability of the facsimile port of the service circuit node to the 87% success rate reported above. In order to alleviate the interference problem, a modified ring back tone, produced from a digital voice file in the service circuit node, is used instead of the standard ring back tone. In the preferred embodiment of the present invention, the modified ring back tone has "off" time that is greater than the period of the CNG signal. In the most preferred embodiment of the present invention, where the CNG signal has a period of 4 seconds (1200 hz tone on for 0.5 second and off for 3.5 seconds), the modified ring back tone is a signal having a 7 second period comprising 2 seconds on and 5 seconds off. By using the preferred modified ring back tone with 5 seconds off, the detection rate for the facsimile port of the service circuit node has been improved from the 87% reported above to 99%.

DETAILED DESCRIPTION OF THE PREFERRED EMBODIMENT

Figure 1:
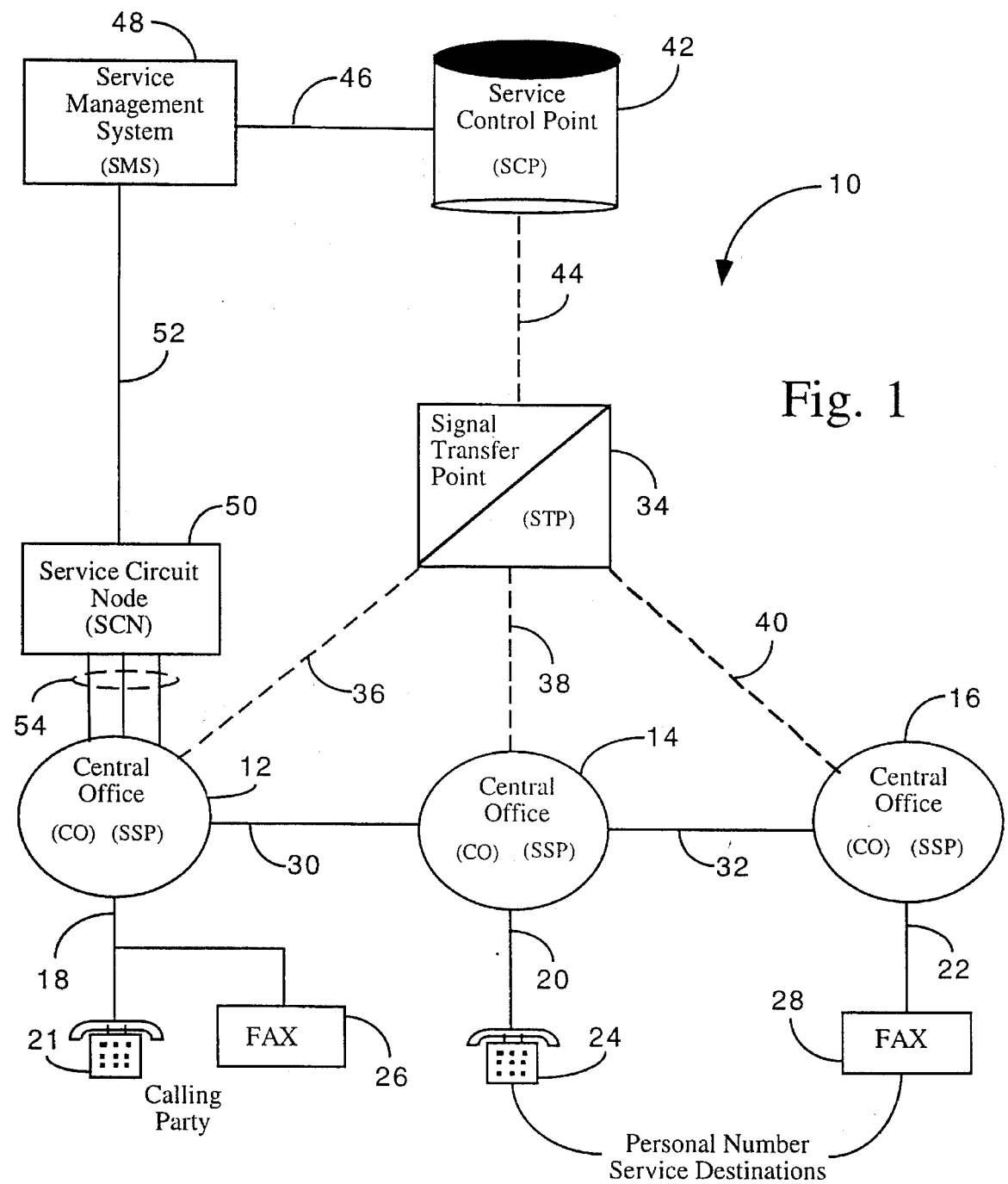
FIG. 1 is a block diagram of the existing advanced intelligent network in a telephone system in the United States which forms the environment of the present invention.

Turning now to the drawing in which like numbers reference like parts or steps, in the several figures, FIG. 1 of this specification is a block diagram representing at least part of the advanced intelligent network (AIN) 10 of a typical local exchange carrier. The components thereon are well known to those skilled in the art. A plurality of SSP central office switches is provided in a typical public switched telephone network. These are indicated as SSP central office switches 12, 14, and 16 in FIG. 1. The number of SSP central office switches depends on the number of subscribers to be served by the public switched telephone network. SSP is an acronym for Service Switching Point.

An SSP central office switch includes intelligent network functionality. The SSP central office switch is equipped with appropriate hardware and software so that, when a set of predetermined conditions are detected, the SSP central office switch will initiate a trigger for a predetermined state of a call on a subscriber line, generate the trigger as an appropriate message to be sent out over the AIN, suspend handling of a call until it receives a reply from the network instructing it to take certain action. In the alternative, the SSP central office switch will have a default task to execute if a timeout occurs and no response is provided by the AIN to the query made by the SSP central office switch.

SSP central offices switches 12, 14, and 16 have a plurality of subscriber lines 18, 20, and 22 connected thereto. Typically, the number of subscriber lines for each SSP central office switch will be on the order of 10,000 to 70,000 lines. Each of subscriber lines 18, 20, and 22 is connected to a terminating piece or pieces of customer premises equipment that are represented by a like plurality of telephone sets 21 and 24 and facsimile (FAX) machines 26 and 28 for each of the SSP central office switches 12, 14, and 16.

Interconnecting SSP central office switches 12, 14, and 16 are a plurality of trunk circuits indicated as 30 and 32 in FIG. 1. These are the voice path trunks that interconnect the central offices 12, 14, and 16 and over which calls are connected when completed. It should be understood that central office trunking in a typical urban environment is not limited to a daisy chain arrangement implied by FIG. 1. In other words, in a typical network, trunk circuits will exist between SSP central office switch 12 and SSP central office switch 16. Therefore, when a local call is made between two central offices, if a direct trunk connection exists between the offices, and is not busy, the network will assign that trunk to the completion of that particular call. If there is no direct trunking between the two central offices, or the direct trunks are all in use, the call will be routed along trunks from the originating central office to at least one other central office, and through subsequent trunk connections on to the terminating central office.

This general architecture is magnified when a wider geographic area that includes multiple local exchange carriers is considered. In that case, the only significant difference is that certain interexchange carrier switches that switch nothing but long distance trunk circuits are included.

Most of the intelligence of the advanced intelligent network resides in the remaining components shown on FIG. 1. These are the computers and switches that embody the current version of the common channel interoffice signaling scheme mentioned above. Each of SSP central office switches 12, 14, and 16 is connected to a local signal transfer point (STP) 34 via respective data links 36, 38, and 40. Currently, these data links are 56 kilobit per second bi-directional data links employing a signaling protocol referred to as Signaling System 7 (SS7). The SS7 protocol is well known to those skilled in the art and is described in a specification promulgated by the American National Standards Institute (ANSI). The SS7 protocol is a layered protocol wherein each layer provides services for layers above it and relies on the layers below to provide it with services. The protocol employs packets that include the usual beginning and terminating flags and a check bit. Additionally, a signal information field is provided that includes a variable length user specific data and a routing label. A service information octet is provided that identifies a priority of the message, the national network of the destination of the message, and the user name identifying the entity that created the message. Also, certain control and sequence numbers are included within the packet, the uses and designations of which are known to those skilled in the art and described in the above referenced ANSI specification.

All of the SS7 data packets from the SSP central office switches go to a signal transfer point (STP) 34. Those skilled in the art will recognize that signal transfer point 34 is simply a multi-port high speed packet switch that is programmed to respond to the routing information in the appropriate layer of the SS7 protocol, and route the packet to its intended destination. The signal transfer point is not normally, per se, the destination of a packet, but merely directs traffic among the other entities on the network that generate and respond to the data packets. It should be noted that signal transfer point devices such as STP 34 are conventionally installed in redundant pairs within the network so that if one device fails, its mate takes over until the first STP is able to return to service. In practice, there are redundant data links between each of SSP central office switches 12, 14, and 16 for enhanced reliability. For the sake of simplicity of the drawings, the redundant devices have not been illustrated in the drawing figures in this specification.

Much of the intelligence, and the basis for many of the new enhanced features of the network reside in the local service control point (SCP) 42 that is connected to signal transfer point 34 via SS7 data link 44. As is known to those skilled in the art, service control points, such as SCP 42, are physically implemented by relatively powerful fault tolerant computers. Typical implementation devices include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically accommodate one to twenty seven disk drives ranging from 300 megabytes to 1.2 gigabytes per drive, and have main memory on the order of 24 to 192 megabytes. Thus, it will be appreciated that these are large and powerful computing machines. Among the functions performed by the service control points are maintenance of network data bases used in providing enhanced services. The computers embodying the SCPs, such as SCP 42, can execute at a speed on the order of 17 million instructions per second. Using the SS7 protocol, this translates to about 50 to 100 transactions (query/response pairs) of network messages per second.

Service control point computers were initially introduced into the network to handle the necessary translations and billing transactions for the implementation of 800 number service, i.e., toll free (to the caller) long distance service. An 800 number subscriber has at least one dial-up line number that is to be called when a call to that subscriber's 800 number is placed. There is no physical central office or area of the country that corresponds to the 800 area code. It is significantly more economical to provide a few central locations at which the lookup of the directory number for an 800 call can be made than to provide the translation information redundantly at many central office switches. Currently, service control points also include data bases for credit card call transactions.

Also, service control points, such as SCP 42, include data bases that identify particular service customers. In order to keep the processing of data and calls as simple and generic as possible at central office switches, such as SSP central office switches 12, 14, and 16, a relatively small set of triggers are defined at the SSP central office switches for each call. A trigger in the network is an event associated with a particular subscriber line that generates a packet to be sent to the service control point 42. The trigger causes the service control point 42 to query its data base to determine whether some customized calling feature or enhanced service should be implemented for this particular call, or whether conventional plain dial-up telephone service should be provide for the call. The results of the data base inquiry are sent back to the switch from SCP 42 through STP 34. The return packet includes instructions to the SSP central office switch as to how to process the call. The instruction may be to take some special action as a result of a customized calling service or enhanced feature, or may simply be an indication that there is no entry in its data base that indicates that anything other than plain telephone service should be provided for the particular call. In response to receiving the latter type message, the SSP central office switch will move through its call states, collect the called digits, and generate further packets that will be used to set up and route the call, as described hereinabove. Similar devices for routing calls among various local exchange carriers are provided by regional signal transfer points (not shown) and regional service control points (not shown).

Service control point 42 is connected via data link 46 to a service management system (SMS) 48. The regional service control points (not shown) are also connected to the service management system 48. The service management system 48 is also implemented by a large general purpose digital computer and interfaces to business offices of the local exchange carrier and interexchange carriers. The service management system 48 downloads information to the data bases of the service control point 42 when subscribers modify their ensemble of AIN services. Similarly, the service management system 48 downloads, on a non-realtime basis, billing information that is needed in order to appropriately invoice telephone company subscribers for the services provided.

The modern advanced intelligent network 10 also includes service circuit nodes (SCNs) such as service circuit node 50 shown in FIG. 1. Those skilled in the art will be familiar with service circuit nodes, which are physically implemented by the same types of computers that embody the service control point 42. In addition to the computing capability and data base maintenance features, service circuit node 50 also includes voice, CNG signal, and DTMF signal recognition devices, tone generation devices, and voice synthesis devices. Service circuit node 50 is connected to service management system 48 via a data link 52 that services the service circuit node 50 in essentially the same way it services SCP 42. While service circuit node 50 is physically quite similar to SCP 42, there are some important differences in the uses to which it is put. Service control points, such as SCP 42, normally implement high volume routing services, such as call forwarding and 800 number translation and routing. They are also used for maintenance of and providing access to high volume data bases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

By contrast, service circuit nodes, such as service circuit node 50, are used principally when some enhanced feature or service is needed that requires an audio connection to the call or transfer of a significant amount of data to a subscriber over a switched connection during or following a call. As shown in FIG. 1, service circuit node 50 is typically connected to one or more (but normally only a few) SSP central office switches via Integrated Service Digital Network (ISDN) links shown as lines 54. Thus, services that are implemented during a call (i.e., after completion of ringing or called subscriber pick up) as well as recognition of CNG signals for routing personal number service employ the facility of a service circuit node such as service circuit node 50.

As previously stated, the advanced intelligent network 10 shown in FIG. 1, can be used to provide enhanced telephone services including personal number service. In connection with providing personal number service, a personal number is assigned to a subscriber. The subscriber then provides a hierarchical list of telephone lines (such as lines 20 and 22 in FIG. 1) to which calls should be routed when the calling party dials the subscriber's personal number. A hierarchical list is provided to the service management system 48 in connection with setting up the subscriber's personal number service. Ultimately, the data relating to the subscriber's personal number service is transferred from the service management system 48 via line 46 to service control point 42 where it is stored in order to process calls made to the subscriber's personal number. As previously noted the subscriber data base could be stored at the service circuit node 50 instead of the service control point 42. For the following discussion, the subscriber data base will be considered to be stored at the service control point.

In connection with describing the present invention which is useful in implementing personal number service, FIG. 1 illustrates a personal number service subscriber which has two destination lines 20 and 22. Destination line 20 is connected to a standard telephone set 24, and destination line 22 is connected to the subscriber's facsimile machine 28. It will be appreciated that the subscriber's personal number service could have additional destination lines hierarchically ordered on the basis of time, identity of caller, or other parameter designated when the personal number service was set up. Only destination lines 20 and 22 are illustrated for the sake of simplicity. In connection with the subscriber's personal number service, all voice calls to the subscriber's personal number should be connected to line 20 and the standard telephone set 24. Facsimile transmissions should be connected to line 22 and the facsimile machine 28, or, base on the subscriber's specification, facsimile transmissions could be stored at the service circuit node for later retrieval. In order to accomplish that intended result of either transfer or storage of facsimile transmissions, it is necessary for the advanced intelligent network 10 to identify whether a call made to the subscriber's personal number originates from a calling party's standard telephone set 21 or from a calling party's facsimile machine 26.

In connection with handling a call made by the calling party's facsimile machine 26 to the subscribers personal number, the facsimile machine 26 goes off hook on line 18 and establishes a connection to SSP central office switch 12.

Facsimile machine 26 then dials the subscriber's personal number. The SSP central office switch 12 upon receiving the dialed personal number on line 18 creates a packet of data for transmission to the service control point 42 via data link 36, signal transfer point 34, and data link 44. The packet represents a query to the service control point 42 to determine whether the number dialed by facsimile machine 26 requires any sort of enhanced services or special handling. The service control point 42 queries its data base and determines that the facsimile machine 26 has dialed a number designated for personal number service. The service control point 42 responds to the SSP central office 12 via data link 44, signal transfer point 34, and data link 36. The return response from service control point 42 directs the SSP central office switch 12 to suspend normal call setup and to determine whether the incoming call on line 18 is a facsimile transmission or standard voice call.

The SSP central office switch 12 presents the call on line 18 to service circuit node 50 via one of the lines 54. The service circuit node 50 sends an answer signal back to the SSP central office switch 12 via the line 54 thereby indicating existence of the connection. In response to the answer signal, the SSP central office switch 12 opens a speech path between line 18 and the service circuit node 50. Once the speech path is open on line 54, the service circuit node 50 begins transmitting a ring back tone to line 18 via the SSP central office switch 12. The ring back tone is always transmitted because the possibility always exists that the call may have originated from the telephone set 21 on line 18, and the human user should have the feedback of a ring back tone which indicates that call processing is underway. At the same time, the service circuit node 50 allocates a facsimile port 62a (FIG. 2) to the speech path. The facsimile port 62a monitors the line 18 in an effort to detect the presence of a CNG signal from the incoming call from line 18. As will be described in greater detail, the present invention relates to the way in which the service circuit node 50 determines whether a CNG signal is present.

If the service circuit node 50 detects the presence of the CNG signal and transfer of the call has been specified by the subscriber, the service circuit node instructs the SSP central office switch 12 to transfer the call to line 22 which has been designated for receipt of facsimile transmission and which is connected to facsimile machine 28. The SSP central office switch 12 then sets up a call between line 18 of the calling party and line 22 of SSP central office switch 16. If the subscriber has designated storage of the facsimile transmission, the service circuit node stores the facsimile transmission for later retrieval and then terminates the call. Alternatively, if the service circuit node 50 does not detect the presence of the CNG signal on line 18, the SSP central office switch 12 in accordance with previous instructions from the service control point 42 sets up the call between line 18 of the calling party and line 20 of SSP central office switch 14 thereby connecting the calling party to the telephone set 24 of the personal number service subscriber.

Figure 2:
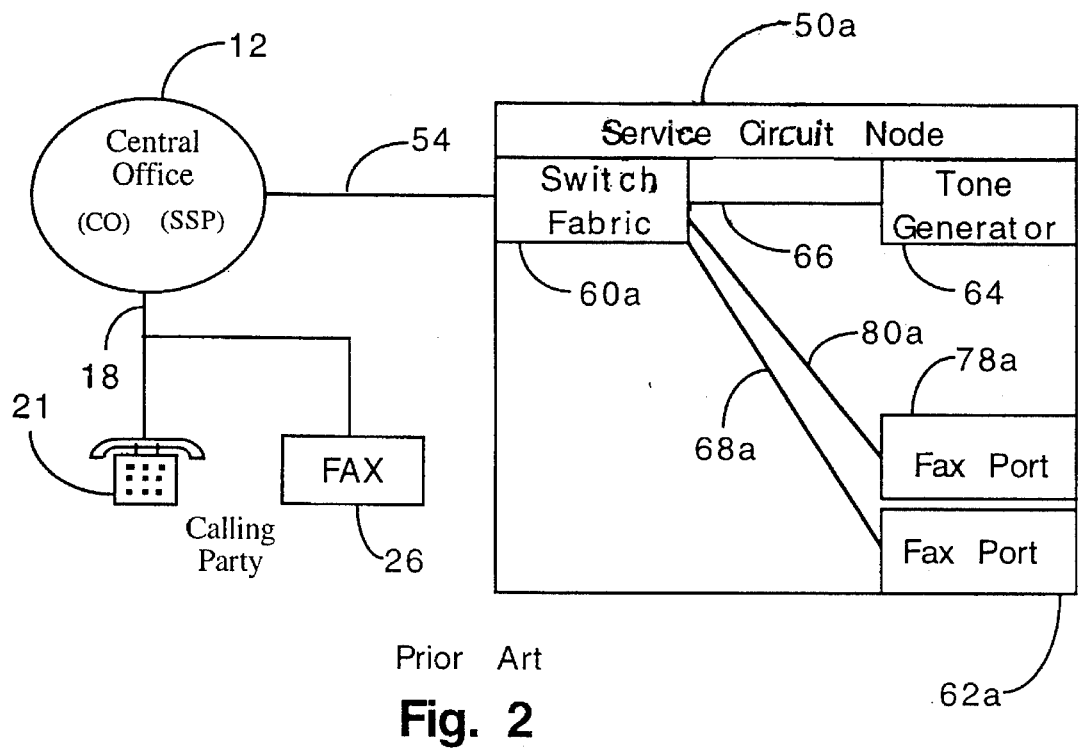
FIG. 2 is a block diagram showing of the service circuit node of the advanced intelligent network which service circuit node is configured for and operates in conventional fashion for the detection of a CNG signal from an incoming call.

Turning to FIG. 2, there is shown at portion of the advanced intelligent network 10 including SSP central office switch 12 and service circuit node 50. FIG. 2 illustrates a conventional service circuit node 50a which includes a switch fabric 60a which, under the control of the decision logic resident in the service circuit node, connects the line 54 to tone generator 64 via line 66 and to facsimile port 62a via line 68a. As previously described, the SSP central office switch 12, on instructions from the service control point 42, presents the call on line 18 to the service circuit node 50a on line 54. The service circuit node 50a sends an answer signal back to the SSP central office switch 12 over line 54. The service circuit node then opens a speech path between line 18 and the switch fabric 60a. Once the speech path is open, the tone generator 64, in accordance with conventional practice, transmits the standard ring back tone to the calling party's line 18 via the SSP central office switch 12. The standard ring back tone produced by tone generator 64 is well known to those of ordinary skill in the art and has a 6 second period consisting of a 2 second on time followed by a 4 second off time. The standard ring back tone serves as feedback to a human caller to indicate that the advanced intelligent network is attempting to complete the call as dialed.

During the same time, the service circuit node 50a also connects a facsimile port 62a to the switch fabric 60a via line 68a in order to monitor the signals on line 18 and thereby detect the presence of a CNG signal on line 18 of the calling party. The facsimile port 62a includes a standard detector for CNG signals and is well known to those of ordinary skills in the art. Particularly, the facsimile port 62a is programmed to detect the existence of the standard CNG signal which has a 4 second period consisting of a 0.5 second 1200 hz tone followed by 3.5 seconds of silence. If the CNG signal is detected and the subscriber has designated that facsimile transmissions are to be transferred to line 22 and facsimile machine 28, the decision logic in the service circuit node 50a drops the connection between the switch fabric 60a and the facsimile port 62a, and the service circuit node 50a instructs the SSP central office switch 12 to connect the call to line 22 of SSP central office switch 16. Alternatively, if the CNG signal is detected and the subscriber has designated that facsimile transmissions are to be recorded for later retrieval, the decision logic in the service circuit node 50a, after dropping the connection to facsimile port 62a, connects the facsimile port 78a to the switch fabric 60a via line 80a, instructs the SSP central office switch 12 to connect the call on line 18 to line 54, and instructs the facsimile port 78a to record the facsimile transmission.

As has been previously stated, a conventional service circuit node such as 50a which returns the standard ring back tone while monitoring line 18 for the CNG signal is successful in detecting the presence of the CNG signal about 87% of the time. In other words, the service circuit node 50a can determine in about 87% of the cases whether the calling party is using the facsimile machine 26. Therefore, in 13% of the cases, the service circuit node 50a fails to make the right determination and connects the calling party's facsimile machine 26 to the telephone set 24 of the personal number service subscriber. Consequently, the personal number service subscriber answers telephone 24 only to find that he or she is listening to the CNG signal from the calling party's facsimile machine 26. As a result, the call connected in error has to be terminated, and the calling party must initiate a new call with the facsimile machine 26.

Figure 3:
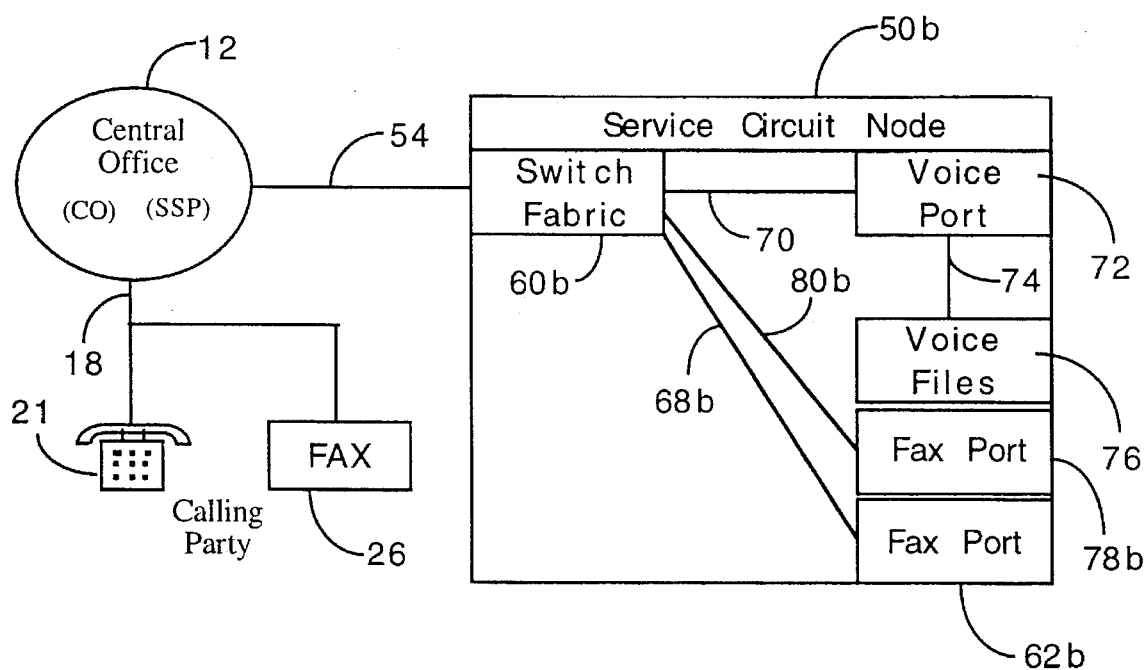
FIG. 3 is a block diagram showing of the service circuit node of the advanced intelligent network which service circuit node is configured for and operates in accordance with the present invention for the detection of a CNG signal from an incoming call.

In accordance with the present invention, shown in FIG. 3, the service circuit node 50b is modified to assure more consistent detection of the CNG signal. Particularly, the switch fabric 60b is connected via line 70 to a voice port 72 which is in turn connected via line 74 to a voice file 76. The switch fabric 60b is connected to the facsimile port 62b via line 68b. As previously described, the SSP central office switch 12, on instructions from the service control point 42, presents the call on line 18 to the service circuit node 50b on line 54. The service circuit node 50b sends an answer signal back to the SSP central office switch 12 over line 54. The service circuit node then opens a speech path between line 18 and the switch fabric 60b. Once the speech path is open, the voice file 76 transmits a modified ring back tone to line 18 of the calling party via line 74, voice port 72, line 70, switch fabric 60b, line 54, SSP central office switch 12. The modified ring back tone produced by voice file 76 has a 7 second period consisting of a 2 second on time followed by a 5 second off time. The modified ring back tone, like the standard ring back tone, serves as feedback to a human caller to indicate that the advanced intelligent network is attempting to complete the call as dialed.

During the same time, the service circuit node 50b also connects a facsimile port 62b to the switch fabric 60b via line 68b in order to monitor the signals on line 18 and thereby detect the presence of a CNG signal on line 18 of the calling party. The facsimile port 62b includes a standard detector for CNG signals and is well known to those of ordinary skills in the art. Particularly, the facsimile port 62b is programmed to detect the existence of the standard CNG signal which has a 4 second period consisting of a 0.5 second on time and a 3.5 second off time. If the CNG signal is detected and the subscriber has designated that facsimile transmissions are to be transferred to line 22 and facsimile machine 28, the decision logic in the service circuit node 50b drops the connection between the switch fabric 60b and the facsimile port 62b, and the service circuit node 50a instructs the SSP central office switch 12 to connect the call to line 22 of SSP central office switch 16. Alternatively, if the CNG signal is detected and the subscriber has designated that facsimile transmissions are to be recorded for later retrieval, the decision logic in the service circuit node 50b, after dropping the connection to facsimile port 62b, connects the facsimile port 78b to the switch fabric 60b via line 80b, instructs the SSP central office switch 12 to connect the call on line 18 to line 54, and instructs the facsimile port 78b to record the facsimile transmission.

Because voice file 76 generates a modified ring back tone having an off time (e.g.. 5 seconds) that is greater than the period of the CNG signal (e.g.. 4 seconds), the path between line 18 and trunk termination network 60b is free of ring back tone during a sufficient period of time to allow a complete period of the CNG signal to be completed. Because of the silence imposed upon the path between line 18 and switch fabric 60b by the voice file 76 for that extended period of time, the likelihood of detecting the existence of the CNG signal is substantially enhanced. As long as the off time of the modified ring back tone is greater than the period of the CNG signal, improvement in detection of the CNG signal by the facsimile port can be achieved. Particularly, tests have shown that by increasing the off time of the ring back tone to 5 seconds, which is 1 second greater than the period of the CNG signal, the consistency of detection is increased from 87% in accordance with conventional detection to 99%. Consequently only 1% of the calls originating from the calling party's facsimile machine 26 are connected in error to telephone set 24 of the personal number service subscriber.

What is claimed is:

1. In an advanced intelligent network for a telephone system for routing a call from a calling party's equipment to a called party, wherein prior to completion of the call to the called party, the call from the calling party's equipment is connected via a line to a service circuit node for the purpose of determining whether a CNG signal, having a CNG period consisting of an on time and an off time, is present in the call from the calling party's equipment, the improvement comprising a detector in the service circuit node connected to the line and a file in the service circuit node for generating a modified ring back tone on the line wherein the modified ring back tone has a period with an on time and an off time wherein the off time is greater than the period of the CNG signal.

2. The telephone system of claim 1, wherein the CNG signal as a period of 4 seconds consisting of a 0.5 second tone (on) followed by 3.5 seconds of silence (off) and the file generates a modified ring back tone having a period of 7 seconds consisting of a 2 second tone (on) followed by 5 seconds of silence (off).

3. A method for routing a telephone call in an advance intelligent network, including a service circuit node, comprising the steps of:

a. determining whether the call requires identification of calling tone signals (CNG) in an incoming call from a calling party's equipment, wherein the CNG signal has a CNG period consisting of an on time and an off time;

b. upon determining that the call requires identification of CNG tones, routing the call to the service circuit node via a line c. establishing a connection from the calling party's equipment to the service circuit node;

d. transmitting a modified ring back tone from the service circuit node to the calling party's equipment via the connection, wherein the modified ring back tone has a period consisting of an on time and an off time and wherein the off time of the modified ring back tone is greater than the CNG period;

e. detecting whether the incoming call from the calling party's equipment includes the CNG signal;

f. completing the call to a predetermined destination based on the results of detecting whether the incoming call from the calling party's equipment includes the CNG signal.

4. The method of claim 3, wherein the CNG signal has a period of 4 seconds consisting of a 0.5 second tone (on) followed by 3.5 seconds of silence (off) and the modified ring back tone has a period of 7 seconds consisting of a 2 second tone (on) followed by 5 seconds of silence (off).

\* \* \* \* \*